(12) United States Patent
Melrose et al.

(10) Patent No.: US 8,584,879 B2
(45) Date of Patent: Nov. 19, 2013

(54) PLASTIC CONTAINER HAVING A DEEP-SET INVERTIBLE BASE AND RELATED METHODS

(75) Inventors: David Melrose, Auckland (NL); John Denner, York, PA (US); Paul Kelley, Wrightsville, PA (US); Gregory Trude, Seven Valleys, PA (US)

(73) Assignee: Co2pac Limited (NZ)

( * ) Notice: Subject to any disclaimer, the term of this patent is extended or adjusted under 35 U.S.C. 154(b) by 906 days.

(21) Appl. No.: 11/704,368

(22) Filed: Feb. 9, 2007

(65) Prior Publication Data

US 2008/0047964 A1    Feb. 28, 2008

Related U.S. Application Data

(63) Continuation-in-part of application No. 10/529,198, filed as application No. PCT/NZ03/00220 on Sep. 30, 2003, application No. 11/704,368, which is a continuation-in-part of application No. 10/851,083, filed on May 24, 2004, now Pat. No. 7,543,713, which is a continuation-in-part of application No. 10/444,616, filed on May 23, 2003, now abandoned, which is a continuation-in-part of application No. 10/124,734, filed on Apr. 17, 2002, now Pat. No. 6,612,451, application No. 11/704,368, which is a continuation-in-part of application No. 11/432,715, filed on May 12, 2006, now Pat. No. 7,717,282, which is a continuation of application No. 10/363,400, filed as application No. PCT/NZ01/00176 on Aug. 29, 2001, now Pat. No. 7,077,279.

(60) Provisional application No. 60/284,795, filed on Apr. 19, 2001.

(30) Foreign Application Priority Data

Aug. 31, 2000   (NZ) ........................................ 506684
Jun. 15, 2001   (NZ) ........................................ 512423
Sep. 30, 2002   (NZ) ........................................ 521694

(51) Int. Cl.
  *B65D 1/02*   (2006.01)
  *B65D 1/44*   (2006.01)
(52) U.S. Cl.
  USPC ........... 215/373; 215/375; 220/608; 220/609; 220/624
(58) Field of Classification Search
  USPC .......... 215/373, 374, 900, 375; 220/604, 606, 220/608, 624, 609
  See application file for complete search history.

(56) References Cited

U.S. PATENT DOCUMENTS

| 1,499,239 A | 6/1924 | Malmquist |
| D110,624 S | 7/1938 | Mekeel, Jr. |

(Continued)

FOREIGN PATENT DOCUMENTS

| CA | 2077717 A1 | 3/1993 |
| DE | 17 61 753 | 1/1972 |

(Continued)

OTHER PUBLICATIONS

European Search Report (suppl.) of EP 03748817, dated Jul. 9, 2007.

(Continued)

*Primary Examiner* — Sue A Weaver
(74) *Attorney, Agent, or Firm* — Henricks, Slavin & Holmes LLP (57) ABSTRACT

A plastic container comprises an upper portion including a finish defining an opening into the container, a lower portion including a base defining a standing surface, a sidewall extending between the upper portion and the lower portion, the sidewall defining a longitudinal axis, and at least one substantially transversely-oriented pressure panel located in the lower portion. The pressure panel is movable between an outwardly-inclined position and an inwardly-inclined position to compensate for a change of pressure inside the container. The standing surface defines a standing plane, and the entire pressure panel is located between the standing plane and the upper portion of the container when the pressure panel is in the outwardly-inclined position.

16 Claims, 10 Drawing Sheets

(56) References Cited

U.S. PATENT DOCUMENTS

| | | |
|---|---|---|
| 2,124,959 A | 7/1938 | Martin |
| 2,378,324 A | 6/1945 | Ray et al. |
| 2,880,902 A | 4/1959 | Owsen |
| 2,960,248 A | 11/1960 | Kuhlman |
| 2,971,671 A | 2/1961 | Shakman |
| 2,982,440 A | 5/1961 | Harrison |
| 3,043,461 A | 7/1962 | Glassco |
| 3,081,002 A | 3/1963 | Tauschinski et al. |
| 3,174,655 A | 3/1965 | Hurschman |
| 3,301,293 A | 1/1967 | Santelli |
| 3,397,724 A | 8/1968 | Bolen et al. |
| 3,409,167 A | 11/1968 | Blanchard |
| 3,426,939 A | 2/1969 | Young |
| 3,468,443 A | 9/1969 | Marcus |
| 3,483,908 A | 12/1969 | Donovan |
| 3,485,355 A | 12/1969 | Stewart |
| 3,693,828 A | 9/1972 | Kneusel et al. |
| 3,704,140 A | 11/1972 | Petit et al. |
| 3,727,783 A | 4/1973 | Carmichael |
| 3,819,789 A | 6/1974 | Parker |
| 3,883,033 A | 5/1975 | Brown |
| 3,904,069 A | 9/1975 | Toukmanian |
| 3,918,920 A | 11/1975 | Barber |
| 3,935,955 A | 2/1976 | Das |
| 3,941,237 A | 3/1976 | MacGregor |
| 3,942,673 A | 3/1976 | Lyu et al. |
| 3,949,033 A | 4/1976 | Uhlig |
| 4,036,926 A | 7/1977 | Chang |
| 4,037,752 A | 7/1977 | Dulmaine et al. |
| 4,117,062 A | 9/1978 | Uhlig |
| 4,125,632 A | 11/1978 | Vosti et al. |
| 4,134,510 A | 1/1979 | Chang |
| 4,170,622 A | 10/1979 | Uhlig et al. |
| 4,174,782 A | 11/1979 | Obsomer |
| 4,219,137 A | 8/1980 | Hutchens |
| 4,231,483 A | 11/1980 | Dechenne et al. |
| 4,247,012 A | 1/1981 | Alberghini |
| 4,301,933 A | 11/1981 | Yoshino et al. |
| 4,318,489 A | 3/1982 | Snyder et al. |
| 4,318,882 A | 3/1982 | Agrawal et al. |
| 4,321,483 A | 3/1982 | Dugan |
| 4,338,765 A | 7/1982 | Ohmori et al. |
| 4,355,728 A | 10/1982 | Ota et al. |
| 4,377,191 A | 3/1983 | Yamaguchi |
| 4,378,328 A | 3/1983 | Przytulla |
| 4,381,061 A | 4/1983 | Cerny et al. |
| D269,158 S | 5/1983 | Gaunt et al. |
| 4,386,701 A | 6/1983 | Galer |
| 4,412,866 A | 11/1983 | Schoenrock et al. |
| 4,436,216 A | 3/1984 | Chang |
| 4,444,308 A | 4/1984 | MacEwen |
| 4,450,878 A | 5/1984 | Takada et al. |
| 4,465,199 A | 8/1984 | Aoki |
| 4,497,855 A | 2/1985 | Agrawal |
| 4,542,029 A | 9/1985 | Caner et al. |
| 4,610,366 A | 9/1986 | Estes et al. |
| 4,628,669 A | 12/1986 | Herron et al. |
| 4,642,968 A | 2/1987 | McHenry et al. |
| 4,645,078 A | 2/1987 | Reyner |
| 4,667,454 A | 5/1987 | McHenry et al. |
| 4,684,025 A | 8/1987 | Copland et al. |
| 4,685,273 A | 8/1987 | Caner et al. |
| D292,378 S | 10/1987 | Brandt et al. |
| 4,749,092 A | 6/1988 | Sugiura et al. |
| 4,773,458 A | 9/1988 | Touzani |
| 4,785,949 A | 11/1988 | Krishnakumar et al. |
| 4,785,950 A | 11/1988 | Miller et al. |
| 4,807,424 A | 2/1989 | Robinson et al. |
| 4,813,556 A | 3/1989 | Lawrence |
| 4,831,050 A | 5/1989 | Cassidy et al. |
| 4,836,398 A | 6/1989 | Leftault, Jr. et al. |
| 4,840,289 A | 6/1989 | Fait et al. |
| 4,850,493 A | 7/1989 | Howard, Jr. |
| 4,850,494 A | 7/1989 | Howard, Jr. |
| 4,865,206 A | 9/1989 | Behm et al. |
| 4,867,323 A | 9/1989 | Powers |
| 4,880,129 A | 11/1989 | McHenry et al. |
| 4,887,730 A | 12/1989 | Touzani |
| 4,892,205 A | 1/1990 | Powers et al. |
| 4,896,205 A | 1/1990 | Weber |
| 4,921,147 A | 5/1990 | Poirier |
| 4,967,538 A | 11/1990 | Leftault et al. |
| 4,976,538 A | 12/1990 | Ake |
| 4,978,015 A | 12/1990 | Walker |
| 4,997,692 A | 3/1991 | Yoshino |
| 5,004,109 A | 4/1991 | Bartley |
| 5,005,716 A | 4/1991 | Eberle |
| 5,014,868 A | 5/1991 | Wittig et al. |
| 5,024,340 A | 6/1991 | Alberghini et al. |
| 5,060,453 A | 10/1991 | Alberghini et al. |
| 5,067,622 A | 11/1991 | Garver et al. |
| 5,090,180 A | 2/1992 | Sorensen |
| 5,092,474 A | 3/1992 | Leigner |
| 5,133,468 A | 7/1992 | Brunson et al. |
| 5,141,121 A | 8/1992 | Brown et al. |
| 5,178,290 A | 1/1993 | Ota et al. |
| 5,199,587 A | 4/1993 | Ota et al. |
| 5,199,588 A | 4/1993 | Hayashi |
| 5,201,438 A | 4/1993 | Norwood et al. |
| 5,217,737 A | 6/1993 | Gygax et al. |
| 5,234,126 A | 8/1993 | Jonas et al. |
| 5,244,106 A | 9/1993 | Takacs |
| 5,251,424 A | 10/1993 | Zenger et al. |
| 5,255,889 A | 10/1993 | Collette et al. |
| 5,261,544 A | 11/1993 | Weaver, Jr. |
| 5,279,433 A | 1/1994 | Krishnakumar et al. |
| 5,281,387 A | 1/1994 | Collette et al. |
| 5,333,761 A | 8/1994 | Davis et al. |
| 5,341,946 A | 8/1994 | Vailliencourt et al. |
| 5,392,937 A | 2/1995 | Prevot et al. |
| 5,411,699 A | 5/1995 | Collette et al. |
| 5,454,481 A | 10/1995 | Hsu |
| 5,472,105 A | 12/1995 | Krishnakumar et al. |
| 5,472,181 A | 12/1995 | Lowell |
| RE35,140 E | 1/1996 | Powers, Jr. |
| 5,484,052 A | 1/1996 | Pawloski et al. |
| 5,503,283 A | 4/1996 | Semersky |
| 5,593,063 A | 1/1997 | Claydon et al. |
| 5,598,941 A | 2/1997 | Semersky |
| 5,632,397 A | 5/1997 | Fandeux et al. |
| 5,642,826 A * | 7/1997 | Melrose .................. 215/382 |
| 5,672,730 A | 9/1997 | Cottman |
| 5,690,244 A | 11/1997 | Darr |
| 5,704,504 A | 1/1998 | Bueno |
| 5,713,480 A | 2/1998 | Petre et al. |
| 5,730,314 A | 3/1998 | Wiemann et al. |
| 5,730,914 A | 3/1998 | Ruppmann, Sr. |
| 5,737,827 A | 4/1998 | Kuse et al. |
| 5,758,802 A | 6/1998 | Wallays |
| 5,762,221 A | 6/1998 | Tobias et al. |
| 5,780,130 A | 7/1998 | Hansen et al. |
| 5,785,197 A | 7/1998 | Slat |
| 5,819,507 A | 10/1998 | Kaneko et al. |
| 5,829,614 A | 11/1998 | Collette et al. |
| 5,858,300 A | 1/1999 | Shimizu et al. |
| 5,860,556 A | 1/1999 | Robbins, III |
| 5,887,739 A | 3/1999 | Prevot et al. |
| 5,888,598 A | 3/1999 | Brewster et al. |
| 5,897,090 A | 4/1999 | Smith et al. |
| 5,906,286 A | 5/1999 | Matsuno et al. |
| 5,908,128 A | 6/1999 | Krishnakumar et al. |
| D415,030 S | 10/1999 | Searle et al. |
| 5,976,653 A | 11/1999 | Collette et al. |
| RE36,639 E | 4/2000 | Okhai |
| 6,065,624 A | 5/2000 | Steinke |
| 6,077,554 A | 6/2000 | Wiemann et al. |
| 6,105,815 A | 8/2000 | Mazda et al. |
| 6,213,325 B1 | 4/2001 | Cheng et al. |
| 6,228,317 B1 | 5/2001 | Smith et al. |
| 6,230,912 B1 | 5/2001 | Rashid |
| 6,277,321 B1 | 8/2001 | Vailliencourt et al. |
| 6,298,638 B1 | 10/2001 | Bettle |
| 6,375,025 B1 | 4/2002 | Mooney |
| 6,390,316 B1 | 5/2002 | Mooney |

(56) References Cited

U.S. PATENT DOCUMENTS

| | | | |
|---|---|---|---|
| 6,413,466 B1 | 7/2002 | Boyd et al. | |
| 6,439,413 B1 * | 8/2002 | Prevot et al. | 215/381 |
| 6,467,639 B2 | 10/2002 | Mooney | |
| 6,485,669 B1 | 11/2002 | Boyd et al. | |
| 6,502,369 B1 | 1/2003 | Andison et al. | |
| 6,514,451 B1 | 2/2003 | Boyd et al. | |
| 6,585,124 B2 | 7/2003 | Boyd et al. | |
| 6,595,380 B2 | 7/2003 | Silvers | |
| 6,612,451 B2 | 9/2003 | Tobias et al. | |
| 6,662,960 B2 | 12/2003 | Hong et al. | |
| 6,749,780 B2 | 6/2004 | Tobias | |
| 6,763,968 B1 * | 7/2004 | Boyd et al. | 220/608 |
| 6,769,561 B2 | 8/2004 | Futral et al. | |
| 6,779,673 B2 | 8/2004 | Melrose | |
| 6,923,334 B2 | 8/2005 | Melrose et al. | |
| 6,942,116 B2 * | 9/2005 | Lisch et al. | 215/373 |
| 6,983,858 B2 | 1/2006 | Slat et al. | |
| 7,051,889 B2 | 5/2006 | Boukobza | |
| 7,077,279 B2 | 7/2006 | Melrose | |
| 7,137,520 B1 | 11/2006 | Melrose | |
| 7,150,372 B2 | 12/2006 | Lisch et al. | |
| 7,159,374 B2 | 1/2007 | Abercrombie, III et al. | |
| 7,520,400 B2 | 4/2009 | Young et al. | |
| 7,717,282 B2 | 5/2010 | Melrose | |
| 8,127,955 B2 * | 3/2012 | Denner et al. | 215/373 |
| 8,152,010 B2 * | 4/2012 | Melrose | 215/373 |
| 2001/0035391 A1 | 11/2001 | Young et al. | |
| 2002/0074336 A1 | 6/2002 | Silvers | |
| 2002/0096486 A1 | 7/2002 | Bourque et al. | |
| 2002/0153343 A1 * | 10/2002 | Tobias et al. | 215/375 |
| 2002/0158038 A1 | 10/2002 | Heisel et al. | |
| 2003/0015491 A1 | 1/2003 | Melrose | |
| 2003/0186006 A1 | 10/2003 | Schmidt et al. | |
| 2003/0196926 A1 | 10/2003 | Tobias et al. | |
| 2003/0217947 A1 | 11/2003 | Ishikawa et al. | |
| 2004/0016716 A1 | 1/2004 | Melrose et al. | |
| 2004/0028910 A1 | 2/2004 | Yamamoto et al. | |
| 2004/0074864 A1 | 4/2004 | Melrose et al. | |
| 2004/0149677 A1 * | 8/2004 | Slat et al. | 215/380 |
| 2004/0173565 A1 | 9/2004 | Semersky et al. | |
| 2004/0173656 A1 | 9/2004 | Seong | |
| 2004/0211746 A1 | 10/2004 | Trude | |
| 2004/0232103 A1 | 11/2004 | Lisch et al. | |
| 2006/0006133 A1 | 1/2006 | Lisch et al. | |
| 2006/0138074 A1 | 6/2006 | Melrose | |
| 2006/0231985 A1 | 10/2006 | Kelley | |
| 2006/0243698 A1 | 11/2006 | Melrose | |
| 2006/0255005 A1 | 11/2006 | Melrose et al. | |
| 2006/0261031 A1 | 11/2006 | Melrose | |
| 2007/0017892 A1 | 1/2007 | Melrose | |
| 2007/0045312 A1 | 3/2007 | Abercrombie, III et al. | |
| 2007/0051073 A1 | 3/2007 | Kelley et al. | |
| 2007/0084821 A1 | 4/2007 | Bysick et al. | |
| 2007/0125743 A1 | 6/2007 | Pritchett et al. | |
| 2007/0181403 A1 | 8/2007 | Sheets et al. | |
| 2007/0199915 A1 | 8/2007 | Denner et al. | |
| 2007/0199916 A1 | 8/2007 | Denner et al. | |
| 2007/0215571 A1 | 9/2007 | Trude | |
| 2007/0235905 A1 | 10/2007 | Trude et al. | |
| 2008/0047964 A1 | 2/2008 | Denner et al. | |

FOREIGN PATENT DOCUMENTS

| | | |
|---|---|---|
| DE | 21 02 319.8 | 8/1972 |
| DE | 32 15 866 | 11/1983 |
| EP | 0 521 642 | 1/1993 |
| EP | 0 551 788 | 7/1993 |
| EP | 0 666 222 | 8/1995 |
| EP | 0 609 348 | 1/1997 |
| EP | 0 916 406 | 5/1999 |
| EP | 0 957 030 | 11/1999 |
| EP | 1 063 076 | 12/2000 |
| FR | 1571499 | 6/1969 |
| FR | 2607109 | 5/1988 |
| GB | 781103 | 8/1957 |
| GB | 1113988 | 5/1968 |
| GB | 2050919 | 1/1981 |
| GB | 2372977 | 9/2002 |
| GE | 2000 677 U | 8/2000 |
| JP | 48-31050 | 9/1973 |
| JP | 49-28628 | 7/1974 |
| JP | 54-72181 | 6/1979 |
| JP | 56-72730 | 6/1981 |
| JP | 55-114717 | 2/1982 |
| JP | 63-189224 | 8/1988 |
| JP | 64-009146 | 1/1989 |
| JP | 03-043342 | 2/1991 |
| JP | 03-076625 | 4/1991 |
| JP | 05-193694 | 8/1993 |
| JP | 06-336238 | 12/1994 |
| JP | 07-300121 | 11/1995 |
| JP | 8053115 A | 2/1996 |
| JP | 08-253220 | 10/1996 |
| JP | 09-039934 | 2/1997 |
| JP | 09-110045 | 4/1997 |
| JP | 10-167226 | 6/1998 |
| JP | 10-181734 | 7/1998 |
| JP | 10-230919 | 9/1998 |
| JP | 2000-168756 A | 6/2000 |
| JP | 2000-229615 | 8/2000 |
| JP | 2002-127237 | 5/2002 |
| JP | 2006-501109 | 1/2006 |
| NZ | 240448 | 6/1995 |
| NZ | 296014 | 10/1998 |
| NZ | 335565 | 10/1999 |
| NZ | 506684 | 8/2000 |
| NZ | 512423 | 6/2001 |
| NZ | 521694 | 10/2003 |
| RU | 2096288 C1 | 11/1997 |
| WO | WO 93/09031 | 5/1993 |
| WO | WO 93/12975 | 7/1993 |
| WO | WO 94/05555 | 3/1994 |
| WO | WO 97/03885 | 2/1997 |
| WO | WO 97/14617 | 4/1997 |
| WO | WO 97/34808 | 9/1997 |
| WO | WO 99/21770 | 5/1999 |
| WO | WO 01/40081 | 12/1999 |
| WO | WO 00/51895 | 9/2000 |
| WO | WO 02/02418 | 1/2002 |
| WO | WO 02/18213 | 3/2002 |
| WO | WO 02/085755 | 10/2002 |
| WO | WO 2004/028910 | 4/2004 |
| WO | WO 2004/106175 | 12/2004 |
| WO | WO 2004/106176 | 12/2004 |
| WO | WO 2005/012091 | 2/2005 |
| WO | WO 2006/113428 | 10/2006 |
| WO | WO 2007/127337 | 11/2007 |

OTHER PUBLICATIONS

IPRP for PCT/NZ03/000220, completed Jan. 11, 2005.
IPRP with Written Opinion for PCT/US2004/016405; completed Nov. 25, 2005.
ISR for PCT/NZ01/000176 (WO 02/018213), mailed Nov. 25, 2005.
ISR for PCT/NZ03/00220, mailed Nov. 27, 2003.
ISR for PCT/US2004/016405 attached to WO 2004/106176.
Notice of Rejection of Japanese Patent Application No. 2002-523347, dated May 24, 2011.
International Preliminary Report on Patentability with Written Opinion issued in International Application No. PCT/US2004/024581, dated Jan. 30, 2006.
International Preliminary Report on Patentability with Written Opinion issued in International Application No. PCT/US2007/010182, dated Oct. 28, 2008.
International Search Report issued in International Application No. PCT/US2004/024581, dated Jul. 25, 2005.
International Search Report issued in International Application No. PCT/US2007/010182, dated Oct. 19, 2007.

* cited by examiner

PLASTIC CONTAINER HAVING A DEEP-SET INVERTIBLE BASE AND RELATED METHODS

CROSS-REFERENCE TO RELATED APPLICATIONS

The present application is a continuation-in-part of U.S. patent application Ser. No. 10/529,198, filed on Dec. 15, 2005, now U.S. Pat. No. 8,152,010, which is the U.S. National Phase of International Application No. PCT/NZ2003/000220, filed on Sep. 30, 2003, which claims priority of New Zealand Application No. 521694, filed on Sep. 30, 2002. The present application is also a continuation-in-part of U.S. patent application Ser. No. 10/851,083, filed on May 24, 2004, now U.S. Pat. No. 7,543,713, which is a continuation-in-part of U.S. application Ser. No. 10/444,616, filed on May 23, 2003, abandoned, which is a continuation-in-part of U.S. application Ser. No. 10/124,734, filed on Apr. 17, 2002, now U.S. Pat. No. 6,612,451, which claims priority of U.S. Provisional Patent Application No. 60/284,795, filed on Apr. 19, 2001. This application is a also a continuation-in-part of co-pending U.S. patent application Ser. No. 11/432,715, filed on May 12, 2006, now U.S. Pat. No. 7,717,282, which is a continuation of co-pending U.S. patent application Ser. No. 10/363,400, filed on Feb. 26, 2003, U.S. Pat. No. 7,077,279, which is the U.S National Phase of PCT/NZ01/00176, filed on Aug. 29, 2001, which in turn claims priority to New Zealand Patent Application No. 506684, filed on Aug. 31, 2000, and New Zealand Patent Application No. 512423, filed on Jun. 15, 2001. The disclosure of each of the aforementioned applications is incorporated herein by reference thereto.

BACKGROUND OF THE INVENTION

1. Field of the Invention

The present invention relates generally to a hot-fill container structure that allows for the removal of vacuum pressure within the container, and more particularly, to a hot-fill container structure having an invertible vacuum panel deeply set into the base of the container. The present invention also relates to methods of making and processing containers having an invertible vacuum panel deeply set into the base of the container.

2. Related Art

So called "hot-fill" containers are known in the art. Plastic containers, such as PET containers, are filled with various liquid contents at an elevated temperature, typically around 185° F. Once the liquid within the container cools, the volume of the contained liquid reduces, creating a vacuum within the container that pulls inwardly on the side and end walls of the container. This in turn leads to deformation of the plastic container if it is not constructed rigidly enough to resist the vacuum forces.

Typically, vacuum pressures have been accommodated by the use of vacuum panels that deflect inwardly under vacuum pressure. Known vacuum panels are typically located in the container sidewall and extend parallel to the longitudinal axis of the container, and flex inwardly under vacuum pressure toward the longitudinal axis.

It is also known in the prior art to have a flexible base region to provide additional vacuum compensation. All such known prior art containers, however, have substantially flat or inwardly recessed base surfaces that deflect further inward to compensate for the vacuum forces. Known flexible base regions have not been able to adequately compensate for the vacuum forces on their own (i.e., vacuum panels in the sidewall and/or or other reinforcing structures are still required).

Therefore, there remains a need in the art for plastic containers that overcome the aforementioned shortcomings of the prior art.

BRIEF SUMMARY OF THE INVENTION

The present invention relates to a plastic container having an invertible pressure panel located in the container base. The pressure panel is movable from an initial, outwardly-inclined position, to an inverted, inwardly-inclined position, in order to reduce the volume of the container and accommodate for vacuum forces within the container. The entire pressure panel is set deeply into the base of the container, such that no portion of the pressure panel extends beyond the standing ring, regardless of whether the pressure panel is in the initial position or the inverted position. This configuration can allow the container to be supported by the standing ring regardless of whether the pressure panel is in the initial position or the inverted position.

According to one exemplary embodiment, the present invention relates to a plastic container comprising an upper portion including a finish defining an opening into the container, a lower portion including a base defining a standing surface, a sidewall extending between the upper portion and the lower portion, the sidewall defining a longitudinal axis, and at least one substantially transversely-oriented pressure panel located in the lower portion. The pressure panel can be movable between an outwardly-inclined position and an inwardly-inclined position to compensate for a change of pressure inside the container. The standing surface can define a standing plane, and the entire pressure panel can be located between the standing plane and the upper portion of the container when the pressure panel is in the outwardly-inclined position.

According to another exemplary embodiment, the present invention relates to a method of processing a plastic container, comprising the steps of (a) providing a plastic container having an upper portion including a finish, a sidewall, a lower portion including a base defining a standing surface, and a substantially transversely-oriented pressure panel located in the base; (b) introducing heated liquid contents into the plastic container with the pressure panel located in an outwardly-inclined position entirely between the standing surface and the upper portion; (c) capping the plastic container; and (d) moving the pressure panel to an inwardly-inclined position entirely between the standing surface and the upper portion.

According to yet another exemplary embodiment, the present invention relates to a method of blow molding a plastic container, comprising the steps of (a) enclosing a softened polymer material within a blow mold defining a mold cavity, the blow mold comprising at least first and second side mold portions and a base mold portion; (b) inflating the polymer material within the blow mold to at least partially conform the polymer material to the blow mold cavity; and (c) displacing the base mold portion with respect to the first and second side mold portions to form a transverse pressure panel deeply set within a base portion of the plastic container.

Further objectives and advantages, as well as the structure and function of preferred embodiments will become apparent from a consideration of the description, drawings, and examples.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without departing from the spirit and scope of the invention. All references cited herein are incorporated by reference as if each had been individually incorporated.

As discussed above, to accommodate vacuum forces during cooling of the liquid contents within a hot-fill container, plastic containers have typically included a series of vacuum panels located around the sidewall and/or in the base portion. The vacuum panels deform inwardly, and the base deforms upwardly, under the influence of the vacuum forces. This configuration attempts to prevent unwanted distortion elsewhere in the container. However, the container is still subjected to internal vacuum forces. The sidewalls and base merely provide a suitably resistant structure against that force. Additionally, the vacuum panels in the sidewall can undesirably detract from the appearance and feel of the container, and limit the design possibilities for the container.

Typically at a bottling plant, the containers are filled with a hot liquid and then capped before being subjected to a cold water spray, resulting in the formation of a vacuum within the container. The container structure needs to be able to cope with this vacuum force. U.S. patent application Ser. No. 10/529,198, filed on Dec. 15, 2005, the entire content of which is incorporated herein by reference, discloses hot-fill containers that provide for the substantial removal or substantial negation of the vacuum pressure within the containers. The disclosed containers include a transversely-oriented pressure panel located in the container base. The pressure panel is movable between an initial, outwardly inclined position, and an inverted, inwardly inclined position, in order to reduce the volume of the container and accommodate for vacuum forces within the container. The present invention relates to additional embodiments of this concept in which the pressure panel is set deeply into the base of the container, such that no portion of the pressure panel extends beyond the standing ring, regardless of whether the pressure panel is in the initial position or in the inverted position. This configuration can allow the container to be supported by the standing ring regardless of whether the pressure panel is in the initial position or the inverted position.

Referring to FIGS. 1-4, an exemplary embodiment of a plastic container 10 according to the present invention is shown. The container 10 can include an upper portion 12 including a finish 14 that defines an opening into the interior of the container 10. As shown, the finish 14 can include threads 16 or other structures adapted to secure a closure (not shown) onto the container 10. The container 10 can also include a lower portion 18 having a base 20, and a sidewall 22 extending between the upper portion 12 and the lower portion 18. The base 20 can define a standing surface 21 that is substantially flat and adapted to support the container 10 in a substantially upright position (e.g., with longitudinal axis A substantially perpendicular to the surface on which container 10 is resting).

Figure 1:
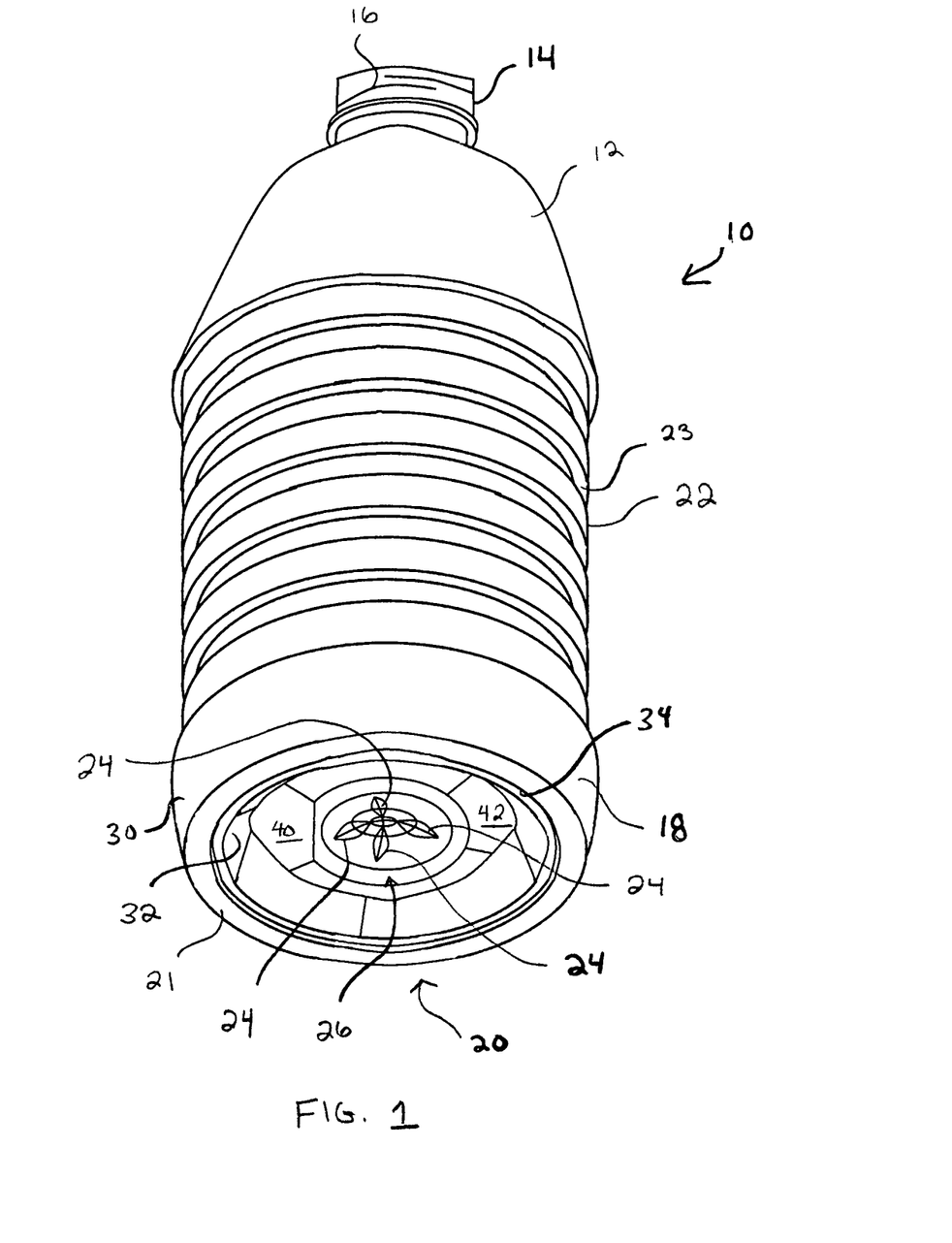
FIG. 1 is a perspective view of an exemplary embodiment of a plastic container according to the present invention, shown with a pressure panel in an initial, outwardly-inclined position.

In the exemplary embodiment shown, the sidewall 22 is substantially tubular and has a substantially circular transverse cross-sectional shape. Alternative cross-sectional shapes can include, for example, an oval transverse cross-section; a substantially square transverse cross-section; other substantially polygonal transverse cross-sectional shapes such as triangular, pentagonal, etc.; or combinations of curved and arced shapes with linear shapes. As will be understood by one of ordinary skill in the art, when the container 10 has a substantially polygonal transverse cross-sectional shape, the corners of the polygon are typically rounded or chamfered. Although the container 10 is shown as having reinforcing rings 23 in the sidewall 22, other embodiments are possible where the sidewall 22 is substantially devoid of such features (e.g., the sidewall 22 can be smooth like that of a conventional glass container).

Figure 4:
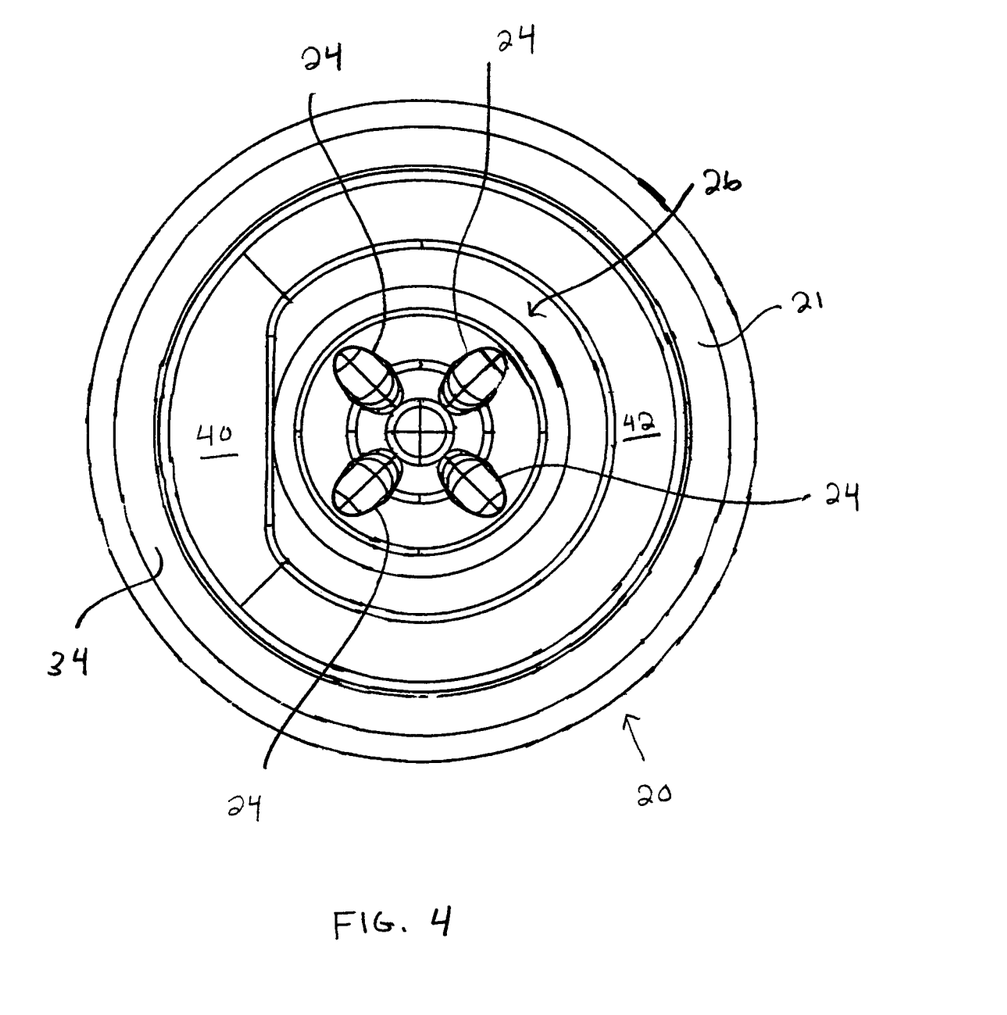
FIG. 4 is a bottom view of the plastic container of FIG. 1.

As best seen in FIG. 4, a portion of the base 20 can include a plurality of reinforcing ribs 24, however other embodiments with or without the reinforcing ribs 24 are possible.

The lower portion 18 of the container 10, and particularly the base 20, can include a substantially transversely-oriented pressure panel 26. The pressure panel 26 can be moved between an outwardly-inclined position (shown in FIGS. 1 and 2) and an inwardly-inclined position (shown in FIG. 3) in order to reduce the internal volume of the container 10 and compensate for any vacuum forces created within the container, for example, during the filling process. For example, the pressure panel 26 may substantially remove the internal vacuum that develops within the container 10 during a hot-fill process once the container 10 has been hot-filled, capped, and cooled.

Figure 2:
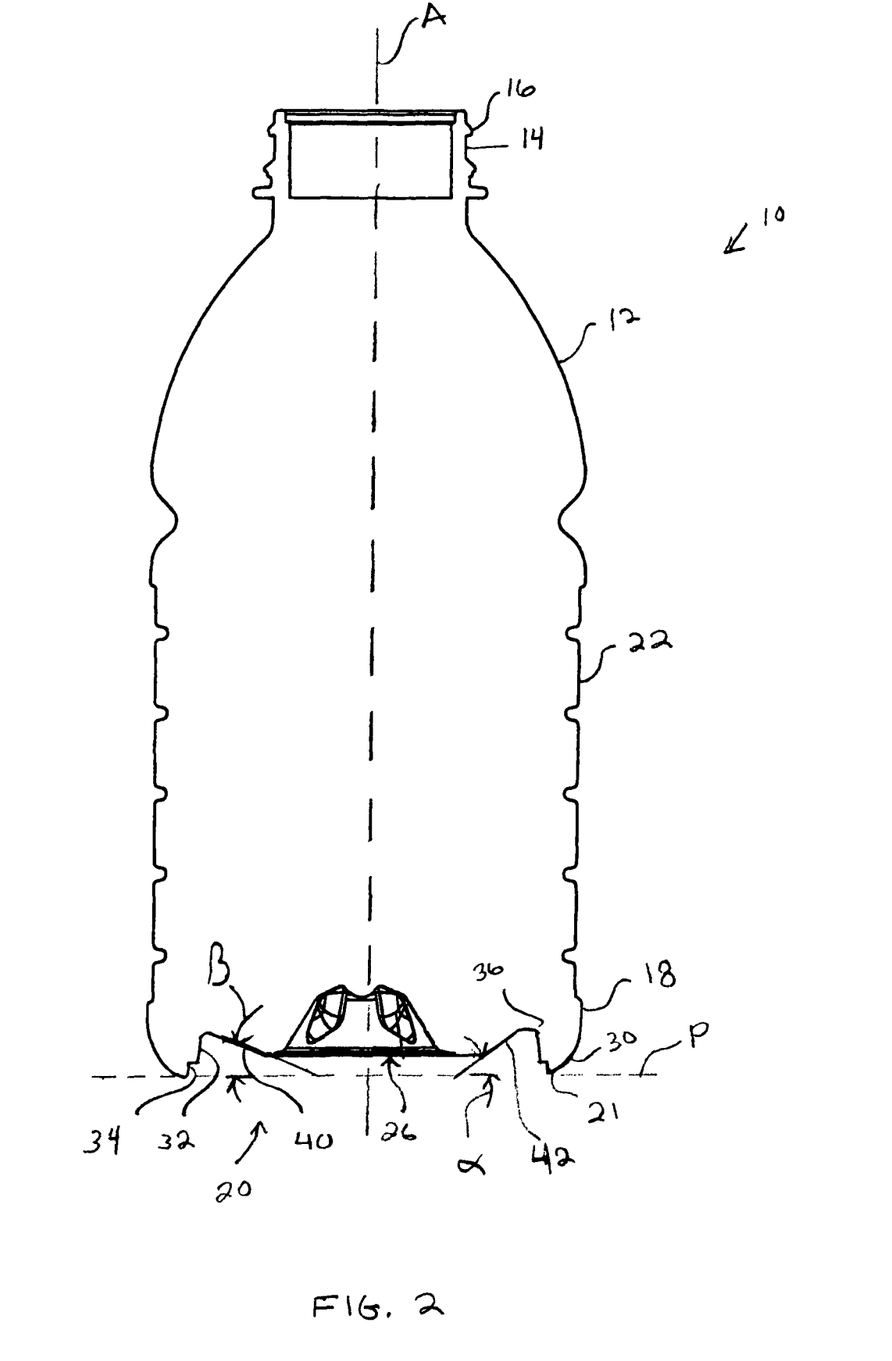
FIG. 2 is a side, sectional view of the plastic container of FIG. 1, shown with the pressure panel in the initial, outwardly-inclined position.
Figure 3:
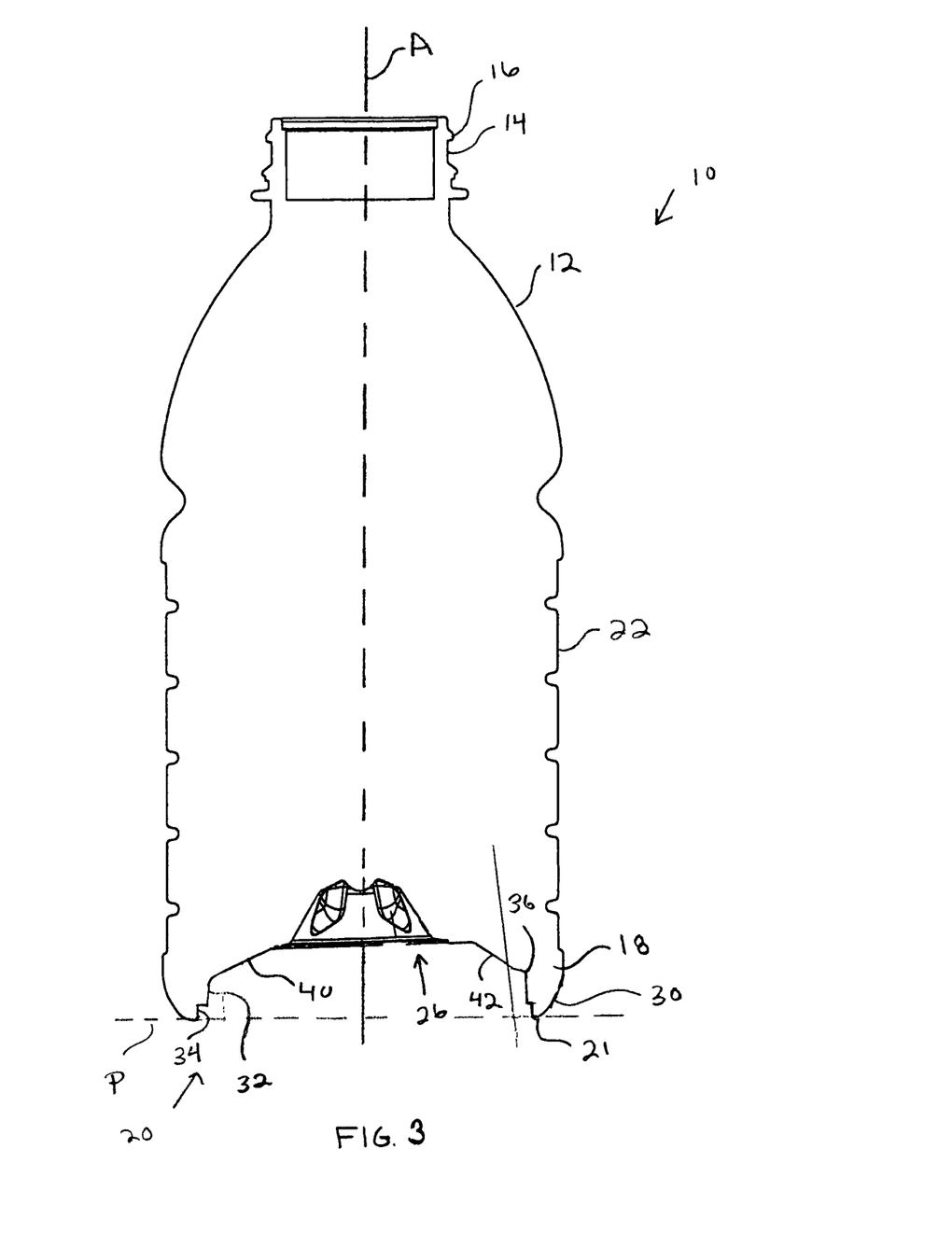
FIG. 3 is a side, sectional view of the plastic container of FIG. 1, shown with the pressure panel in an inverted, inwardly-inclined position.

As best seen in the sectional views of FIGS. 2 and 3, the pressure panel 26 can be deeply set into the container 10 in order to facilitate standing of the container 10 on its standing surface 21 regardless of whether the pressure panel 26 is located in the outwardly-inclined position (FIG. 2) or the inwardly-inclined position (FIG. 3). In other words, the entire pressure panel 26 structure can be located between the plane P of the standing surface 21 and the upper portion 12 of the container 10 when the pressure panel 26 is in the outwardly-inclined position (FIG. 2) and also when the pressure panel 26 is in the inwardly-inclined position (FIG. 3).

According to the exemplary embodiment shown in FIGS. 1-4, the lower portion 18 of the container 10 includes a concave outer wall portion 30 that extends from the lower end of the sidewall 22 to the standing surface 21. The pressure panel 26 is deeply set into the lower portion 18 of the container 10 via an inner wall 32 that extends from the standing surface 21 to the pressure panel 26. In the exemplary embodiment shown, the inner wall 32 is parallel or nearly parallel to the longitudinal axis A of the container 10, however, other configurations and/or inclinations of the inner wall 32 are possible. In addition, one of ordinary skill in the art will know that other configurations besides the inner wall 32 may be implemented to set the pressure panel 26 deeply into the lower portion 18. An annular, recessed channel 34 can be provided in or adjacent the standing surface 21. In the exemplary embodiment shown, the recessed channel has a substantially square cross-section, however, other shapes are possible. Channel 34 can reinforce the standing surface 21 and/or facilitate stacking of multiple containers on top of one another, depending on the shape and size of the finish 14 and/or closure.

Figure 5:
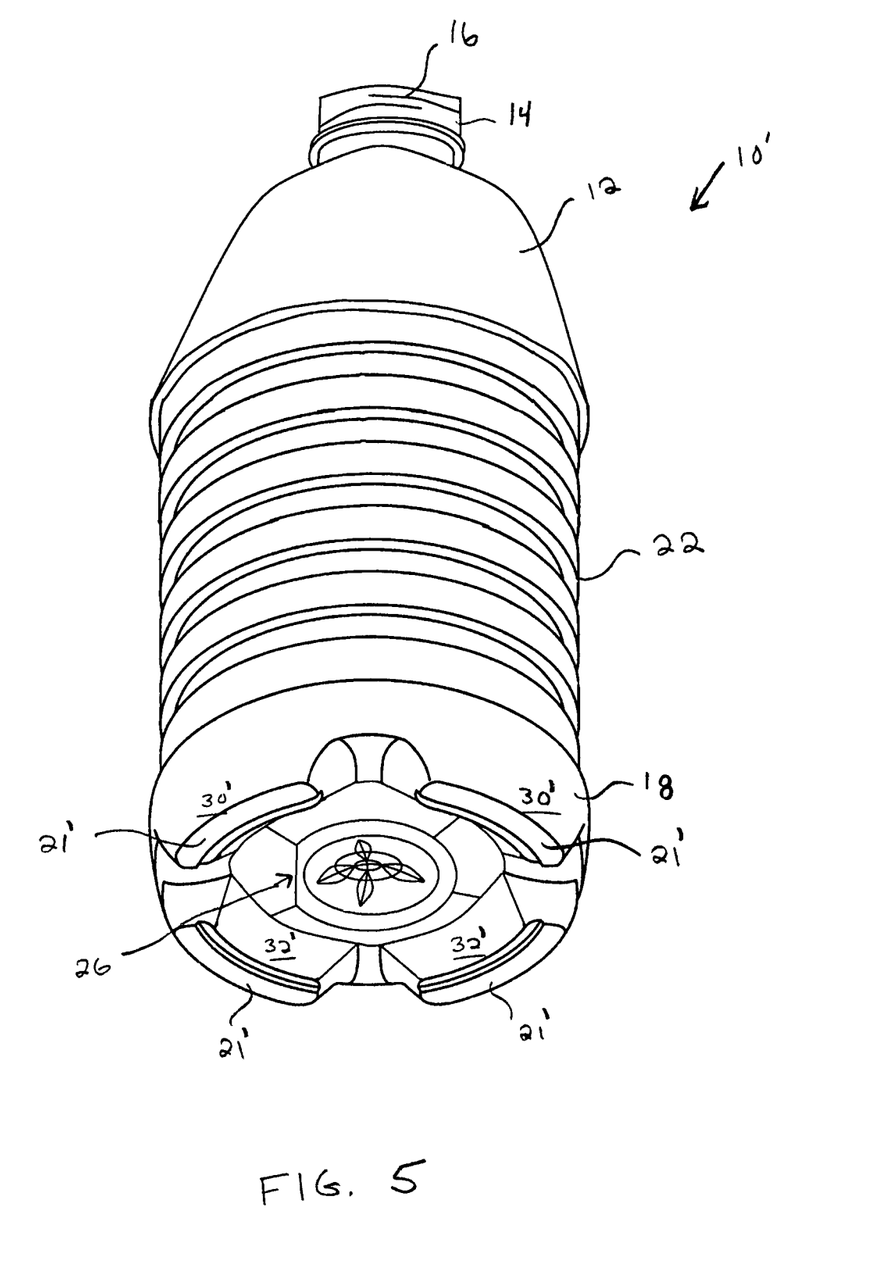
FIG. 5 is a perspective view of another exemplary embodiment of a plastic container according to the present invention, shown with the pressure panel in the initial, outwardly-inclined position.

In the exemplary embodiment of FIGS. 1-4, the standing surface 21, inner wall 32, and outer wall 30 are substantially continuous about the circumference of the container 10 (see FIG. 4). However, as shown in the alternative embodiment of FIGS. 5 and 6, the container 10' can have a standing surface 21', inner wall 32', and outer wall 30' that are discontinuous.

In order to facilitate movement (e.g., folding) of the pressure panel 26 between the outwardly-inclined position of FIG. 2 and the inwardly-inclined position of FIG. 3, pressure panel 26 can include a decoupling or hinge structure 36 that is located between the inner wall 32 and the pressure panel 26. In the exemplary embodiment shown, the hinge structure 36 comprises a substantially flat, non-ribbed region, that is susceptible to folding, however, other configurations of the hinge structure, such as a crease, are possible.

Referring now particularly to FIG. 4, the pressure panel 26 can comprise an initiator portion 40 and a control portion 42. Both the initiator portion 40 and control portion 42 can comprise part of the pressure panel 26 that folds when the pressure panel 26 is moved from its initial position in FIG. 2 to its inverted position in FIG. 3. The initiator portion 40 can be adapted to move or fold before the rest of the pressure panel 26 (e.g., before the control portion 42). In the exemplary embodiment shown, the control portion 42 is at a steeper angle to the standing plane P than the initiator portion 40, thereby resisting expansion of the pressure panel from the inverted state (FIG. 3) to the initial state (FIG. 2), for example, if the container 10 were accidentally dropped.

In order to maximize the amount of vacuum compensation from the pressure panel 26, it is preferable for at least the control portion 42 to have a steep angle of inclination with respect to the standing plane P. As shown in FIG. 2, the control portion 42 can be at a first angle $\alpha$ with respect to the standing plane P. According to one exemplary embodiment, the first angle $\alpha$ can be at least 10 degrees, and preferably is between about 30 degrees and about 45 degrees. According to this embodiment, the initiator portion 1 can be at a second angle $\beta$ with respect to standing plane P, that is at least 10 degrees less than the first angle $\alpha$.

When the pressure panel is inverted from the outward state (FIG. 2) to the inward state (FIG. 3), it can undergo an angular change that is approximately equal to its angle of inclination. For example, if the control portion 42 is initially set at an angle $\alpha$ of about 10 degrees, it will provide an angular change of approximately 20 degrees. At such a low angle of inclination, however, it can be difficult to provide an adequate amount of vacuum compensation in a hot-filled container. Therefore it is preferable to provide the initiator portion 40 and control portion 42 with steeper angles. For example, with the control portion set at an angle $\alpha$ of about 35 degrees, the pressure panel 26 will undergo an angular change of about 70 degrees upon inversion. According to this exemplary embodiment, the initiator portion 40 can be set at an angle $\beta$ of about 20 degrees.

Referring to FIGS. 7-10, a base portion of a container according to an alternative embodiment is shown, wherein the control portion of the pressure panel comprises a substantially continuous conical area extending around the base. According to this embodiment, the initiator portion 142 and the control portion 142 are set at a common angle, such that they form a substantially uniform pressure panel 126. However, initiator portion 140 may still be configured to provide the least amount of resistance to inversion of pressure panel 126, such that it still provides an initial area of folding or inversion. For example, the initiator portion 140 may have a smaller material thickness than the control portion 142. According to the embodiment shown in FIGS. 7-10, initiator portion 140 causes the pressure panel 126 to begin inversion at its region of widest diameter, near the hinge structure 136.

Figure 6:
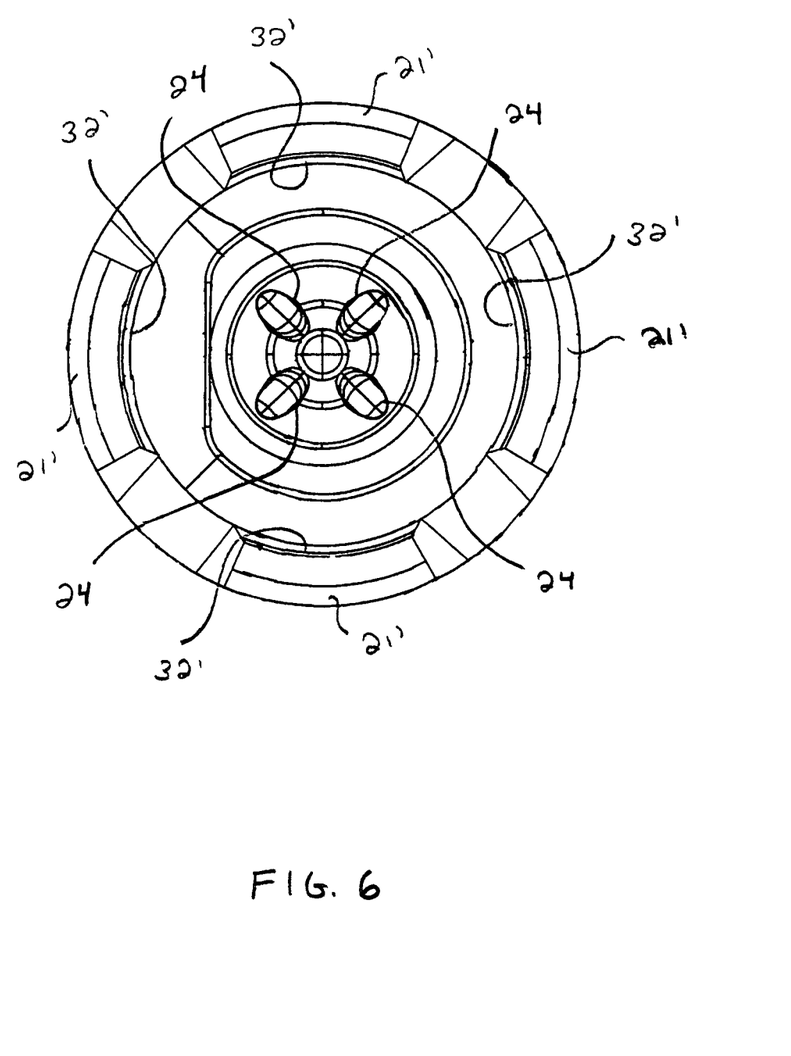
FIG. 6 is a bottom view of the plastic container of FIG. 5.
Figure 7:
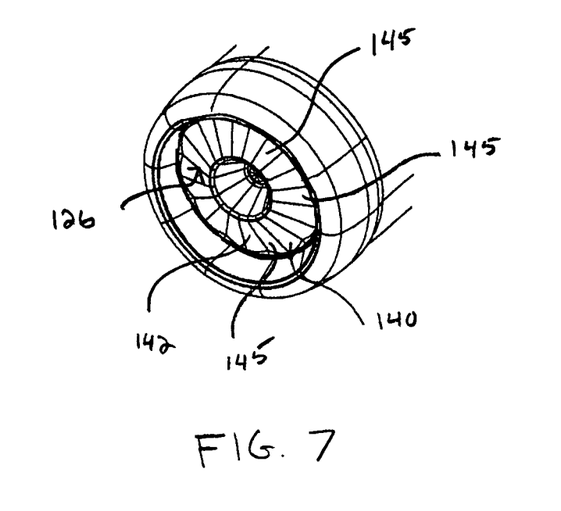
FIG. 7 is a perspective view of a portion of a plastic container according to yet another exemplary embodiment of the present invention, shown with the pressure panel in an initial, outwardly-inclined position.
Figure 8:
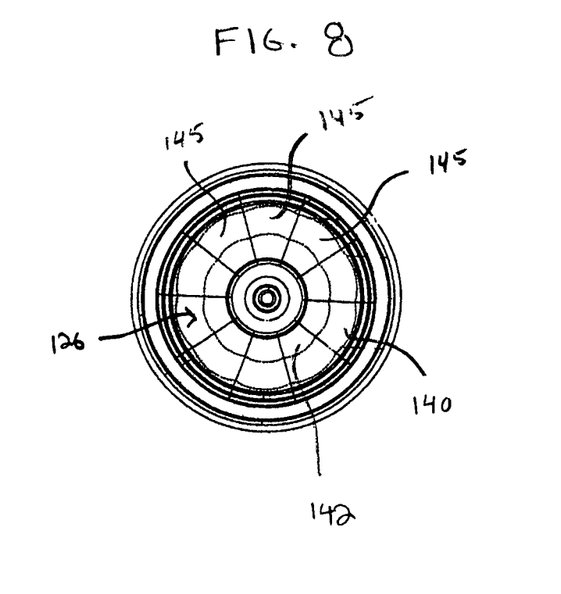
FIG. 8 is a bottom view of the plastic container of FIG. 7.
Figure 9:
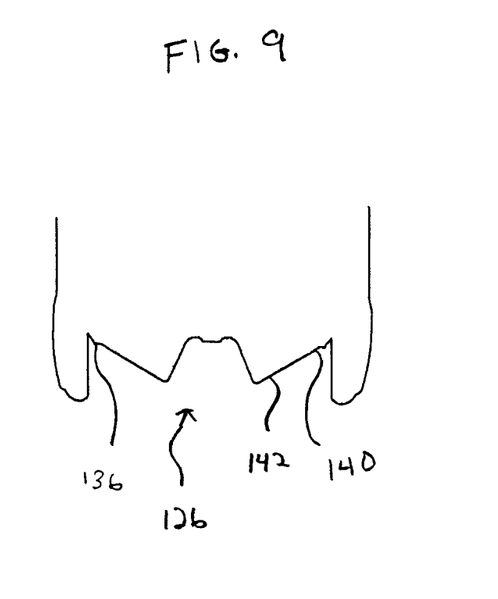
FIG. 9 is a side, sectional view of a portion of the plastic container of FIG. 7, shown with the pressure panel in the initial, outwardly-inclined position.
Figure 10:
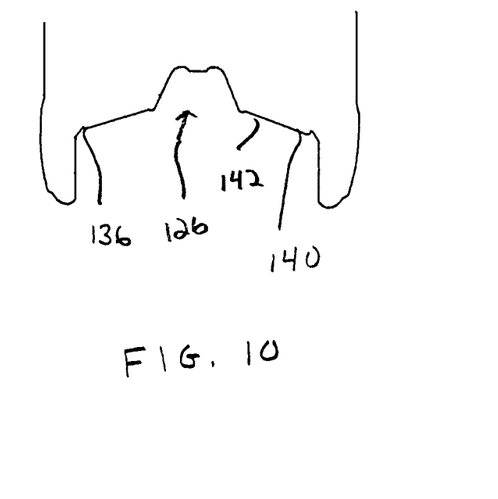
FIG. 10 is a side, sectional view of a portion of the plastic container of FIG. 7, shown with the pressure panel in the inverted, inwardly-inclined position.

Additional structures may be added to the pressure panel 126 in order to add further control over the inversion process. For example, the pressure panel 126 may be divided into fluted regions, as shown in FIGS. 6 and 7. As shown, the fluted regions 145 can be outwardly convex, and evenly distributed around the container's longitudinal axis to create alternating regions of greater and lesser angular inclination. This type of geometry can provide increased resistance against the panel returning from the inward position (FIG. 10) to the outward position (FIG. 9), for example, if the container were dropped. The fluted configuration can also provide more even distribution of forces on the pressure panel 126. According to an alternative embodiment, the flutes can be inwardly concave. Inwardly directed flutes offer less resistance to initial inverting forces, coupled with increased resistance to reverting back to the original, outward position. Further details regarding the pressure panel and fluting are disclosed in co-pending U.S. patent application Ser. No. 10/529,198, filed on Dec. 15, 2005, the entire content of which is incorporated herein by reference.

Figure 11A:
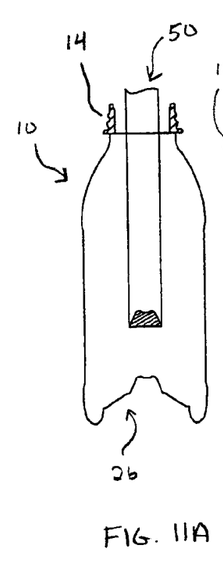
FIGS. 11A-E schematically illustrate an exemplary method of processing a plastic container according to the present invention.
Figure 11B:
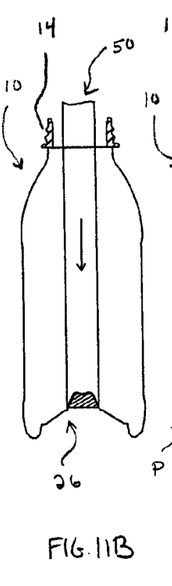

Referring to FIGS. 11A-11E, an exemplary method of processing a plastic container according to the present invention is shown. Prior to processing, the container 10 may be formed (e.g., blow molded) with the pressure panel 26 in the inwardly-inclined position. According to this embodiment, a force can be applied to the pressure panel 26 in order to move the pressure panel 26 into the outwardly-inclined position. For example, as shown in FIGS. 11A and 11B, a first mechanical pusher 50 can be introduced through the opening in the container finish 14 and forced downwardly on the pressure panel 26 in order to move it to the outwardly-inclined position (shown in FIG. 11C). One of ordinary skill in the art will know that other types of mechanical or other forces can alternatively be used to move the pressure panel 26 into the outwardly-inclined position. Alternatively, the container 10 can be initially formed with the pressure panel 26 located in the outwardly-inclined position.

Figure 11C:
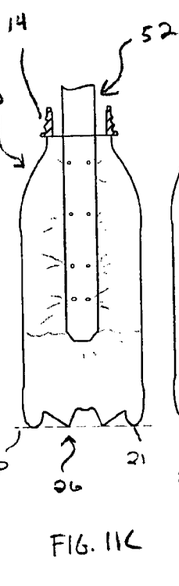

Referring to FIG. 11C, the container 10 can be filled with liquid contents when the pressure panel 26 is located in the outwardly-inclined position. Particularly, the container 10 can be "hot-filled" with the liquid contents at an elevated temperature, for example, 185° C. As shown in FIG. 11C, the liquid contents can be introduced into the container 10 via a filling nozzle 52 inserted through the opening in the container finish 10, although one of ordinary skill in the art will know that any number of known filling devices and techniques can be implemented. According to an alternative embodiment, the first mechanical pusher 50 and the filling nozzle 52 can be the same instrument.

Figure 11D:
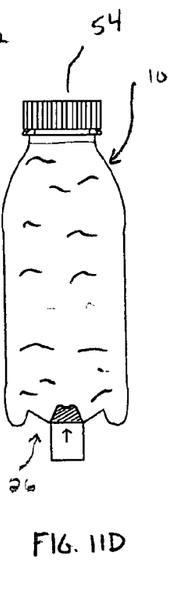

Referring to FIG. 11D, once the container 10 has been filled to the desired level, the filling nozzle 52 can be removed, and a cap 54 can be applied to the container finish 14. Any number of capping techniques and devices known in the art can be used to apply the cap 54 to the container finish 14. Next the container 10 can be cooled, for example, by spraying the container 10 with cool water, or alternatively, by leaving the container 10 in ambient conditions for a sufficient amount of time. As the container 10 and its contents cool, the contents tend to contract. This volumetric change inside the sealed container 10 can create a vacuum force within the container 10.

Figure 11E:
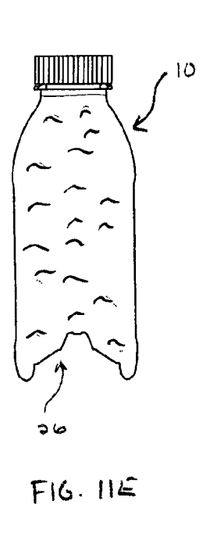

In order to alleviate all or a portion of the vacuum forces within the container 10, the pressure panel 26 can be moved from the outwardly-inclined position of FIG. 11D to the inwardly-inclined position of FIG. 11E. For example, following filling, capping, and cooling of the container 10, an external force can be applied to the pressure panel 26, for example, by a second mechanical pusher 56, as shown in FIG. 11D. Alternatively, the pressure panel 26 can be moved by the creation of relative movement of the container 10 relative to a punch or similar apparatus, in order to force the pressure panel 26 into the inwardly-inclined position. Alternatively, the pressure panel 26 can invert to the inwardly-inclined position under the internal vacuum forces within the sealed container 10. For example, all or a portion of the pressure panel 26 (e.g., the initiator portion) can be made flexible enough to cause the pressure panel 26 to invert under the internal vacuum forces.

The inversion of the pressure panel 26 from the outwardly-inclined position to the inwardly-inclined position reduces the internal volume of the container 10, and thereby increases the pressure inside the sealed container 10. This can alleviate any vacuum created within the container 10 due to the hot-fill process. This can also remedy any deformation of the container 10 that was caused as a result of the internal vacuum.

As shown in FIGS. 11A-E, the entire pressure panel 26 is above the plane P of the standing surface 21 (see FIG. 11C) of the container 10. As a result of this configuration, the containers 10 according to the present invention can be stored, transported, and capped/filled, etc., all while standing on the standing surface 21. This can eliminate the need for any adapters or other devices to stabilize the container 10 in the upright position. This can also make the containers 10 of the present invention more readily adapted for use with conventional, existing container transports, capping and filling stations, and storage facilities.

Figure 12A:
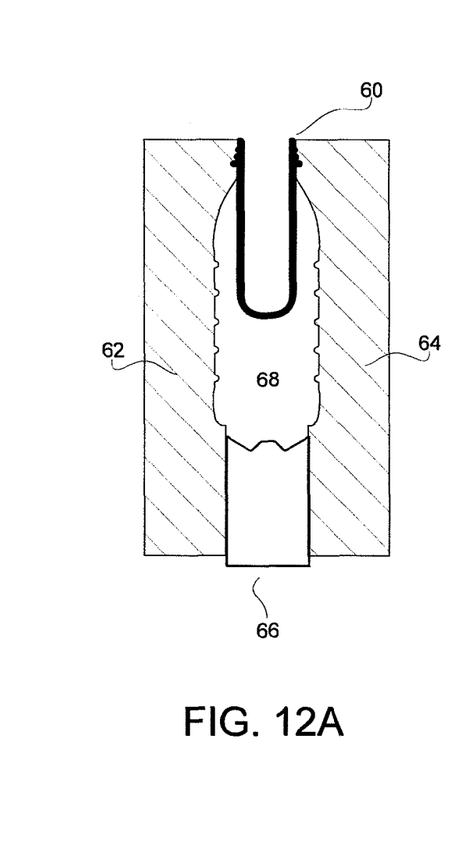
FIGS. 12A-C schematically illustrate an exemplary method of forming a plastic container according to the present invention.
Figure 12B:
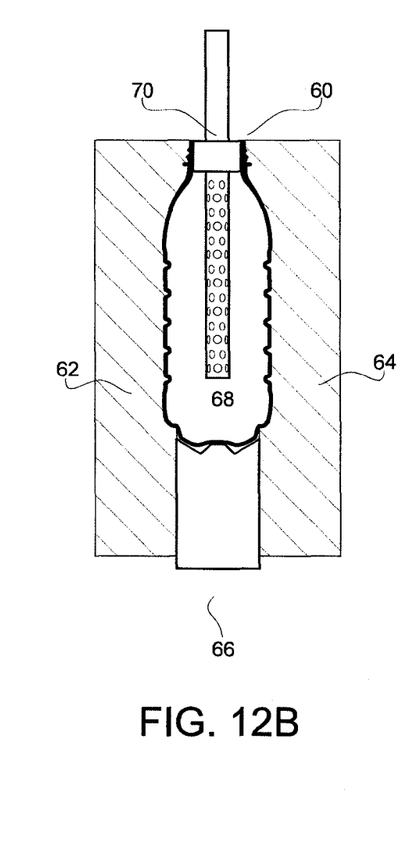
Figure 12C:
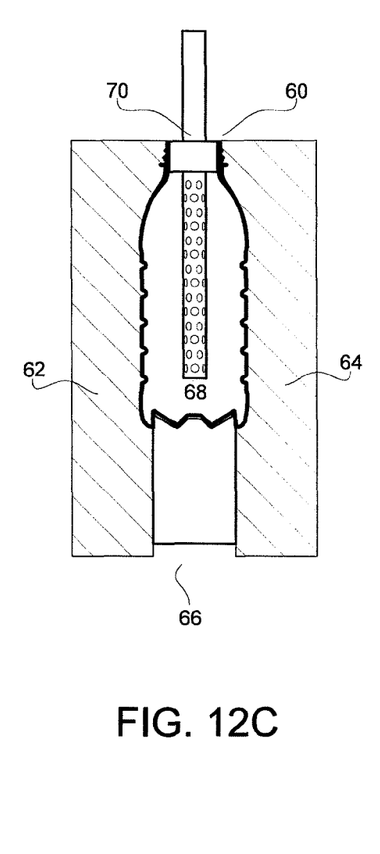

Referring to FIGS. 12A-C, an exemplary method of blow molding a plastic container according to the present invention is shown. Referring to FIG. 12A, the method includes enclosing a softened polymer material (such as PET, PEN, PP, blends thereof, and other suitable materials known in the art) within a blow mold. In the exemplary embodiment shown, the polymer material comprises a plastic container preform 60. However, according to an alternative embodiment, the polymer material can comprise a tube of extruded polymer material, for example, as used in the known process of "extrusion blow molding."

The blow mold can comprise two or more side mold portions 62, 64, and a base mold portion 66. The side mold portions 62, 64 can move from an open position (not shown) in which the side mold portions are separated from one another, to a closed position, shown in FIGS. 12A-C. In the closed position, shown, the side mold portions 62, 64 define a mold cavity 68 having an open bottom. The mold cavity 68 corresponds to the shape of a plastic container to be molded therein. The base mold portion 66 is located in the open bottom region of the mold cavity 68 and is movable with respect to the side mold portions 62, 64 in the vertical direction (as viewed in FIGS. 12A-C) between the retracted position shown in FIGS. 12A and 12B, and the extended position shown in FIG. 12C. Mechanical, pneumatic, hydraulic, or other means known in the art can be implemented to move the base mold portion 66 between the retracted and extended positions.

A stretch rod 70 can be inserted into the neck portion of the softened preform 60, and can be used to stretch or elongate the preform 60. Air or another medium can be expelled from the stretch rod 70 or other device to at least partially inflate the preform 60 into conformity with the mold cavity 68. Preferably, the preform 60 is inflated into substantially complete conformity with the mold cavity 68 while the base mold portion 66 is in the retracted position, as shown in FIG. 12B. This can eliminate the need for the polymer material to expand deeply into tight corners, narrow spaces, etc., that are associated with the deeply-set pressure panel of the present invention. This can avoid resultant thin or weak spots in the formed container.

While the polymer material is still in a softened state, the base mold portion 66 can be displaced upwardly into the mold cavity 68 to form a transverse pressure panel deeply set within the base portion of the plastic container (see, for example, the base 20 and pressure panel 26 of FIGS. 1-4). Air can continue to be expelled into the mold cavity during displacement of the base mold portion 66 to the extended position, or alternatively, the supply of air can be turned off. Referring to FIGS. 1-4, by "deeply set" it is meant that the pressure panel 26 is located entirely between the standing plane P and the upper portion 12 of the container when the pressure panel 26 is in the outwardly-inclined position (FIG. 2) and when it is in the inwardly-inclined position (FIG. 3). In the exemplary embodiment of FIGS. 12A-C, the base mold portion 66 moves substantially along the longitudinal axis of the plastic container being formed in the mold cavity 68, however, other orientations are possible.

Once the plastic container has been formed in the mold cavity 68, the base mold portion 66 can return to the retracted position, and the side mold portions 62, 64 can separate to release the formed container.

By utilizing the blow molding method of the present invention, it is possible to initially form the general container shape with a generally flat bottom portion, and then deflect the bottom upwardly at orientation temperature. As a result, the container base and deeply-set pressure panel can be of improved material thickness and uniformity. In addition, the base and pressure panel can be multi-axially stretch oriented to provide increased strength without the attendant thinness or weakness at the heel portion of the bottle.

The base of the plastic container according to the present invention is preferably crystallized to some extent. Some degree of crystallinity and/or biaxial orientation can be achieved normally during the blow molding process. However, crystallization can be promoted through heat setting of the container. For example, the walls and base of the mold can be held at an elevated temperature to promote crystallization. When the container is heat set at a temperature of about 180° F., the container sidewalls, base, pressure panel, etc., can be typically crystallized to about 20%. This degree of crystallinity is typical for a blow molding process and does not represent a significant amount of heat setting or increased crystallinity or orientation, as compared with a typically prepared container. However, the properties of the base and pressure panel of the present invention can be advantageously enhanced by heat setting the container, and particularly the base and pressure panel, at ever higher temperatures. Such temperatures can be, for example, greater than 250° F. and can be 325° F. or even higher. When these elevated heat set temperatures are utilized, crystallinity can be increased to greater than 20% or 25% or more. One drawback of increasing crystallinity and biaxial orientation in a plastic container is that this process introduces opacity into the normally clear material. However, unlike bases in prior art containers, which can require a crystallinity of 30% or more, utilizing crystallinities of as low as 22-25% with a base structure according to the present invention can achieve significant structural integrity, while maintaining the substantial clarity of a base that is preferred by manufacturers, packagers and consumers.

U.S. Pat. Nos. 4,465,199; 3,949,033; 4,378,328; and 5,004,109, all of which are incorporated herein by reference, disclose further details relating to blow molding methods utilizing displaceable mold portions. The methods disclosed in these references can also be implemented to form plastic containers according to the present invention. According to an alternative embodiment of the invention, the plastic container can be removed from the blow mold prior to forming the deeply-set pressure panel. Outside of the mold, the pressure-panel and related structure(s) can be formed in the base of the plastic container using a mandrel or similar device. U.S. Pat. No. 4,117,062, the entire content of which is incorporated herein by reference, provides further details on this type of post-mold processing.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A plastic container comprising:
    an upper portion including a finish defining an opening into the container;
    a lower portion including a base defining a standing surface;
    a sidewall extending between the upper portion and the lower portion, the sidewall defining a longitudinal axis; and
    at least one substantially transversely-oriented pressure panel located in the lower portion and forming part of the base, the base including a centrally located inward projection and an instep or recess between the pressure panel and the standing surface, the pressure panel being movable between an outwardly-inclined position and an inwardly-inclined position to compensate for a change of pressure induced inside the container; and
    an inner wall extending from the standing surface to the pressure panel;
    wherein the pressure panel is connected to the instep by a hinge structure;
    wherein the standing surface defines a standing plane orthogonal to the longitudinal axis, wherein the pressure panel includes a portion that is outwardly inclined greater than about 10 degrees with respect to the standing plane when in the outwardly-inclined position, and the inner wall has a length substantially parallel to the longitudinal axis whereby the entire pressure panel is located between the standing plane and the upper portion of the container when the pressure panel is in the outwardly-inclined position with the portion outwardly inclined greater than about 10 degrees with respect to the standing plane, wherein the base is configured to be pushed by a force to facilitate movement of the pressure panel from the outwardly-inclined position to the inwardly-inclined position.

2. The plastic container of claim 1, wherein the entire pressure panel is located between the standing plane and the upper portion of the container when the pressure panel is in the inwardly-inclined position.

3. The plastic container of claim 1, wherein the pressure panel comprises an initiator portion and a control portion, and wherein the initiator portion is adapted to provide less resistance than the control portion to inversion of the pressure panel and cause the pressure panel to begin inversion.

4. The plastic container of claim 1, wherein the pressure panel comprises a plurality of flutes forming a substantially conical area.

5. The plastic container of claim 1, wherein the pressure panel is adapted to compensate for internal vacuum created within the container after the container is hot-filled, capped, and cooled.

6. The plastic container of claim 1, further comprising a concave outer wall extending from the lower portion of the container to the standing surface.

7. The plastic container of claim 1, wherein the standing surface defines a substantially continuous ring.

8. The plastic container of claim 1, wherein the standing surface defines a discontinuous ring.

9. The plastic container of claim 1, wherein the base has a higher degree of crystallinity than the sidewall.

10. The plastic container of claim 9, wherein the base has a degree of crystallinity that is greater than about 20%.

11. The plastic container of claim 9, wherein the base has a degree of crystallinity that is less than about 30%.

12. The plastic container of claim 1, wherein the pressure panel comprises an initiator portion and a control portion, wherein the control portion is more steeply inclined than the initiator portion with respect to the standing plane.

13. The plastic container of claim 1, wherein the pressure panel comprises an initiator portion and a control portion, wherein the initiator portion is configured to cause the control portion to flex and invert.

14. The plastic container of claim 13, wherein the initiator portion is inclined at an angle at least 10 degrees less than an angle of inclination of the control portion with respect to the standing plane.

15. The plastic container of claim 14, wherein the control portion is inclined at an angle between about 30 degrees and about 45 degrees with respect to the standing plane.

16. The plastic container of claim 1, wherein the pressure panel comprises an initiator portion and a control portion, wherein the initiator portion yields to longitudinally directed collapsing force before the rest of the pressure panel.

* * * * *